United States Patent [19]

Endo et al.

[11] Patent Number: 5,144,488
[45] Date of Patent: Sep. 1, 1992

[54] ZOOM LENS

[75] Inventors: Hiroshi Endo, Kanagawa; Sadatoshi Takahashi, Tokyo, both of Japan

[73] Assignee: Canon Kabushiki Kaisha, Tokyo, Japan

[21] Appl. No.: 647,226

[22] Filed: Jan. 29, 1991

[30] Foreign Application Priority Data

Feb. 1, 1990 [JP] Japan .................. 2-23365
Feb. 1, 1990 [JP] Japan .................. 2-23366

[51] Int. Cl.$^5$ .................. G12B 15/14; G12B 15/16
[52] U.S. Cl. .................. 359/686; 359/771; 359/772; 359/773
[58] Field of Search .................. 350/423, 475, 427; 359/676, 683, 684, 686, 687, 708, 724, 771, 772, 773

[56] References Cited

U.S. PATENT DOCUMENTS

| 4,451,124 | 5/1984 | Basista et al. | 350/427 |
| 4,629,294 | 12/1986 | Tanaka et al. | 350/427 |
| 4,859,042 | 8/1989 | Tanaka | 350/423 |
| 5,000,550 | 3/1991 | Takahashi et al. | 350/426 |
| 5,032,013 | 7/1991 | Shibayama | 350/429 |

FOREIGN PATENT DOCUMENTS 63-44614 2/1988 Japan .

Primary Examiner—Frank Gonzalez
Attorney, Agent, or Firm—Fitzpatrick, Cella, Harper & Scinto

[57] ABSTRACT

A zoom lens is disclosed comprising, from front to rear, a first lens groups of positive power, a second lens group of negative power, a third lens group of positive power, and a fourth lens group, at least two of these four lens groups being moved to effect zooming and the second lens group being moved to effect focusing, and satisfying the following condition:

$$-0.85 < \beta 2T < -0.65$$

where $\beta 2T$ is the image magnification for an infinitely distant object of the second lens group in the telephoto end.

26 Claims, 8 Drawing Sheets

ZOOM LENS

BACKGROUND OF THE INVENTION

1. Field of the Invention

This invention relates to zoom lenses and, more particularly, to zoom lenses of the inner focusing type. Still more particularly, it relates to wide angle high-range zoom lenses with a zoom ratio of 3.7 and a widest angular field of about 62° suited to be used in photographic cameras, video cameras or cameras for broadcast.

2. Description of the Related Art

For the photographic camera and video camera, there have been a wide variety of previous proposals for zoom lenses having the focusing provision made not in the first lens group, when counted from the object side, but in another lens group which lies in the middle of the lens system, or for employing the so-called inner focusing method.

In general, the inner focusing type of zoom lens has merits over the front focusing type of zoom lens in that, owing to the smaller diameter of the first lens group, the bulk and size of the entire lens system can be easily minimized, that the focusing range can be extended to closer object distances so that particularly extreme close-up photography becomes easy to carry out, and further that, with the help of a relatively small size and light weight of the focusing lens group, a weak driving power suffices for rapid focusing so that in application to the camera of automatic focus detection, the control of focusing becomes easy.

Such an inner focusing type of zoom lens is exemplified in, for example, Japanese Laid-Open Patent Application No. Sho 63-44614 where, in the order from the object side, a first lens group of positive power, a second lens group of negative power for varying the image magnification, a third lens group of negative power for compensating for the image shift with variation of the image magnification, and a fourth lens group of positive power, or four lens groups in all, are used to form a so-called 4-group zoom lens wherein the third lens group is made to move for focusing purposes. With this zoom lens, however, a surplus space must be formed to assure the movement of the third lens group. Therefore, its total length tends to increase largely.

In general, when the inner focusing method is employed in the zoom lens, merits such as those of, as has been described before, reducing the size of the entirety of the lens system and becoming capable of rapid focusing, and further making it easy to extend the focusing range can be obtained.

However, its counterparts are to increase variation of aberrations with focusing, thus giving rise to a problem that it becomes very difficult to obtain high grade optical performance on an infinitely distant object to a close object, or the entire range of object distances, while still affording a minimization of the size of the entire lens system.

Particularly when the widest angular coverage and the range of the zoom lens increase at once, the difficulty of obtaining high grade optical performance throughout the extended zooming range as well as the entire focusing range increases rapidly.

There is U.S. Pat. No. 4,629,294 as a related art of the Invention.

SUMMARY OF THE INVENTION

An object of the invention is to provide a zoom lens employing the inner focusing method.

Another object is to provide a zoom lens of increased widest angular coverage and increased range.

Still another object is to provide a zoom lens of inner focusing type in simple form whose bulk and size is minimized in such manner that good stability of optical performance is maintained throughout the extended zooming range and over the entire focusing range.

BRIEF DESCRIPTION OF THE DRAWINGS

FIGS. 5(A), 5(B) and 5(C), FIGS. 6(A), 6(B) and 6(C), and FIGS. 7(A), 7(B) and 7(C) are graphic representations of the aberrations of the numerical examples 1 to 3. Of the aberration curves, the ones of the figure numbers with suffix (A) are in the wide-angle end, the ones with suffix (B) in an intermediate position, and the others with suffix (C) in the telephoto end.

In these figures, I denotes the first lens group, II the second lens group, III the third lens group and IV the fourth lens group. SP denotes a stop. FP denotes a flare stop, $\Delta S$ the sagittal image surface, and $\Delta M$ the meridional image surface.

DETAILED DESCRIPTION OF THE PREFERRED EMBODIMENTS

Figure 1:
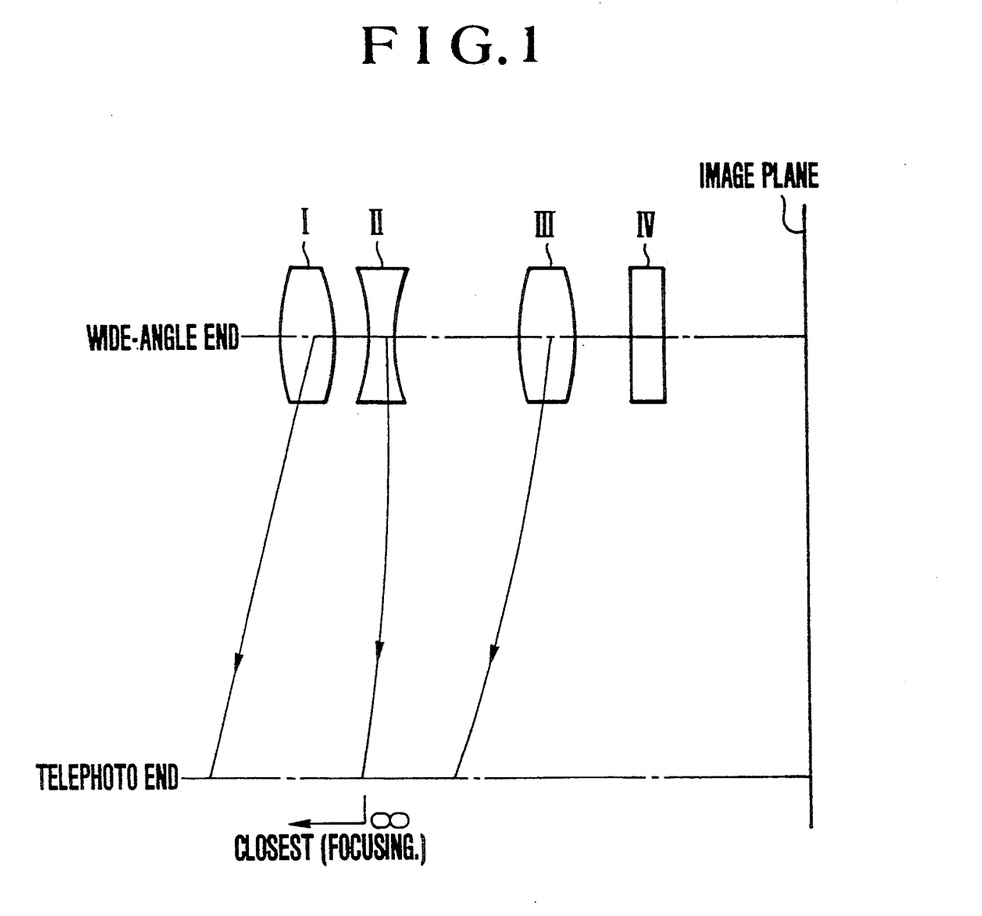
FIG. 1 is a diagram for explaining the paraxial refractive power arrangement of the zoom lens of the invention.
Figure 2:
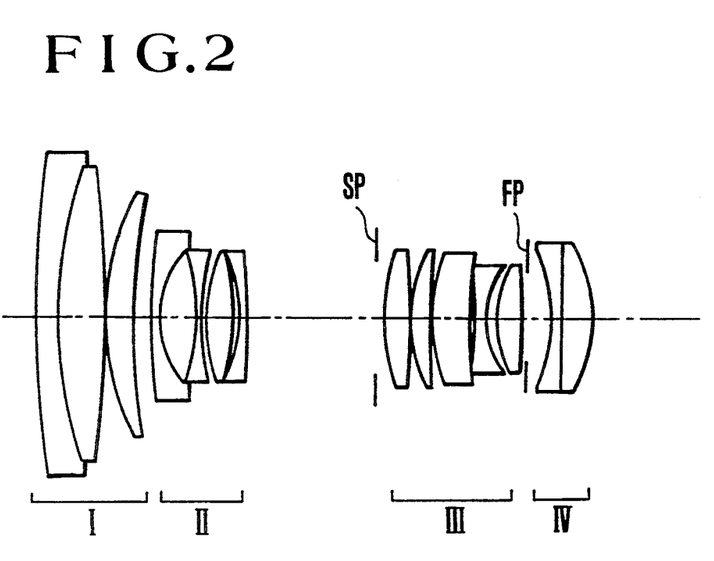
FIG. 2 to FIG. 4 are longitudinal section views of numerical examples 1 to 3 of zoom lenses of the invention in the wide-angle end respectively.
Figure 3:
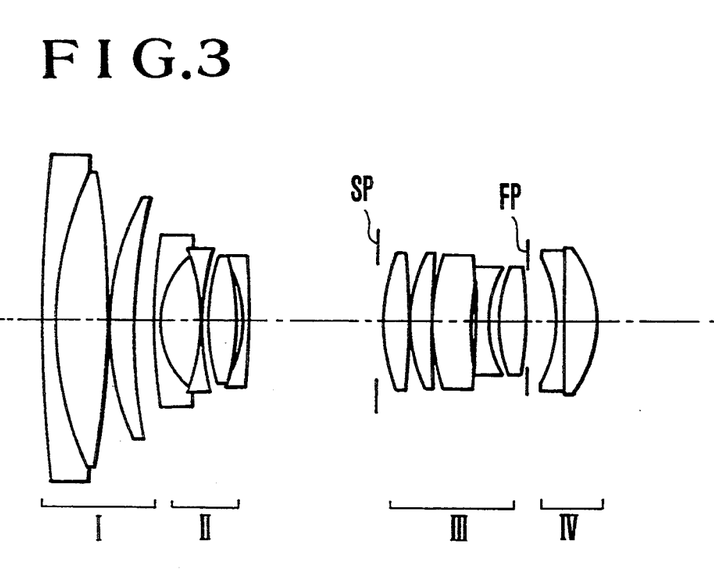
Figure 4:
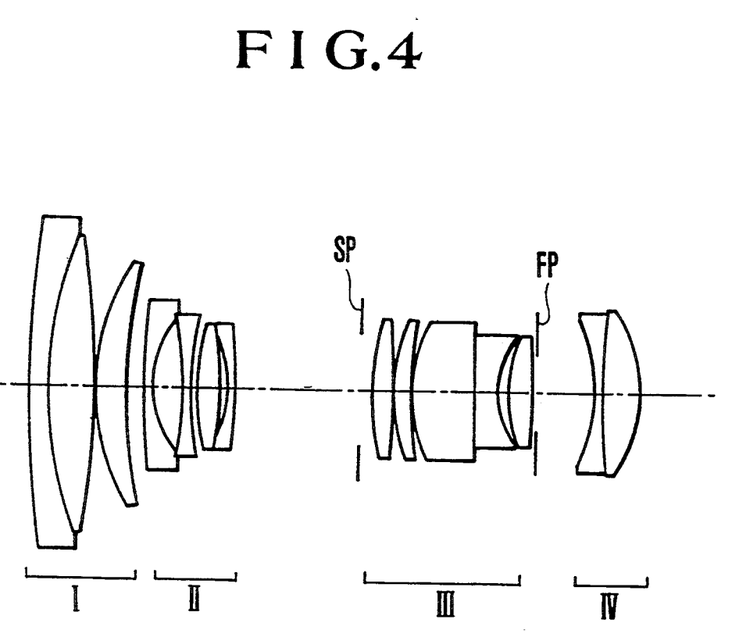
Figure 5A:
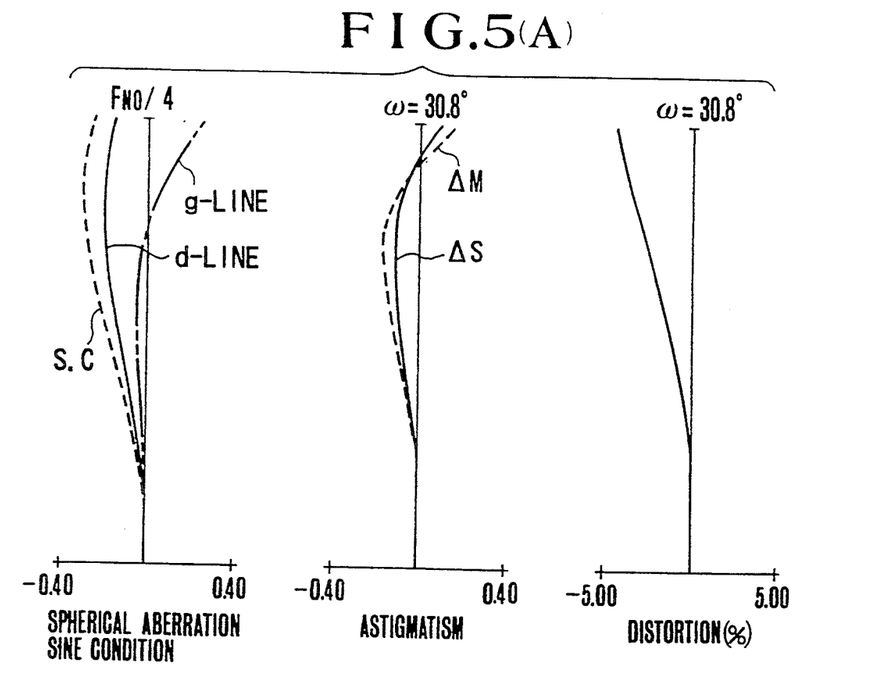
Figure 5B:
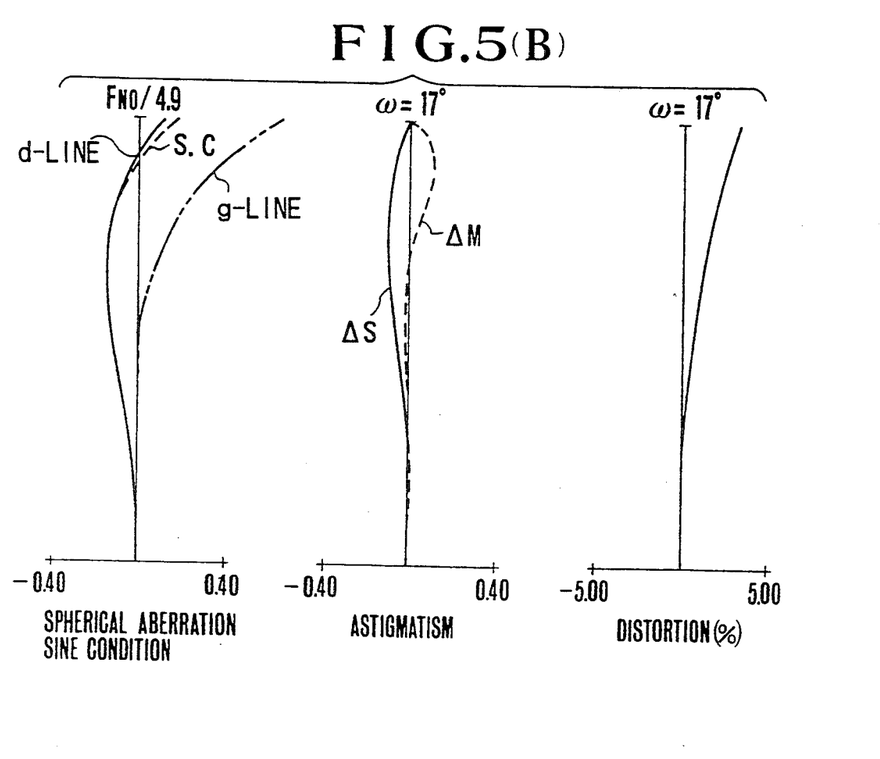
Figure 5C:
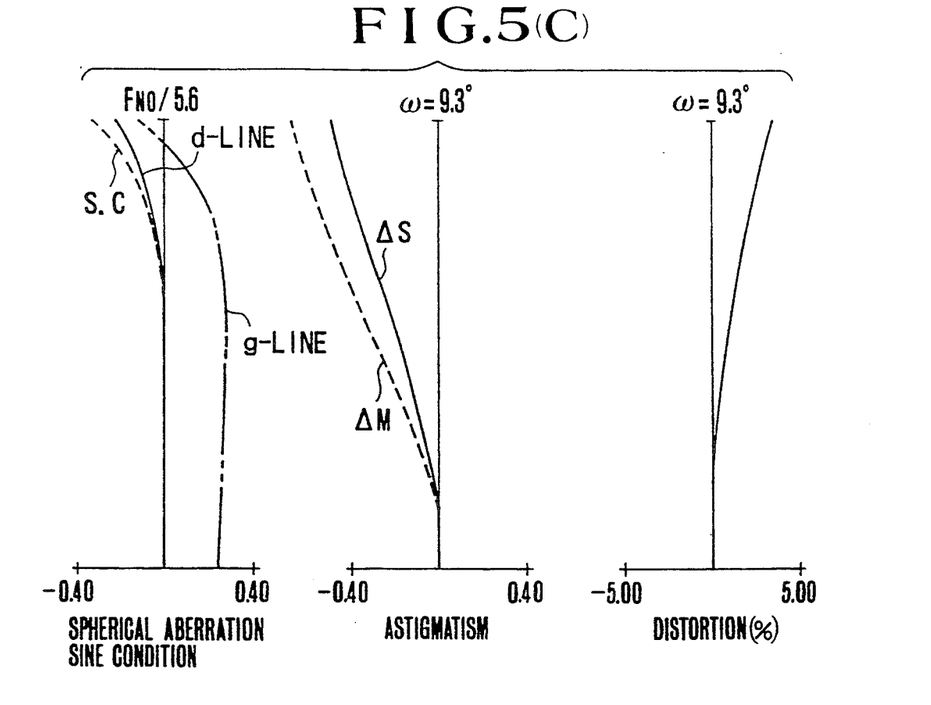
Figure 6A:
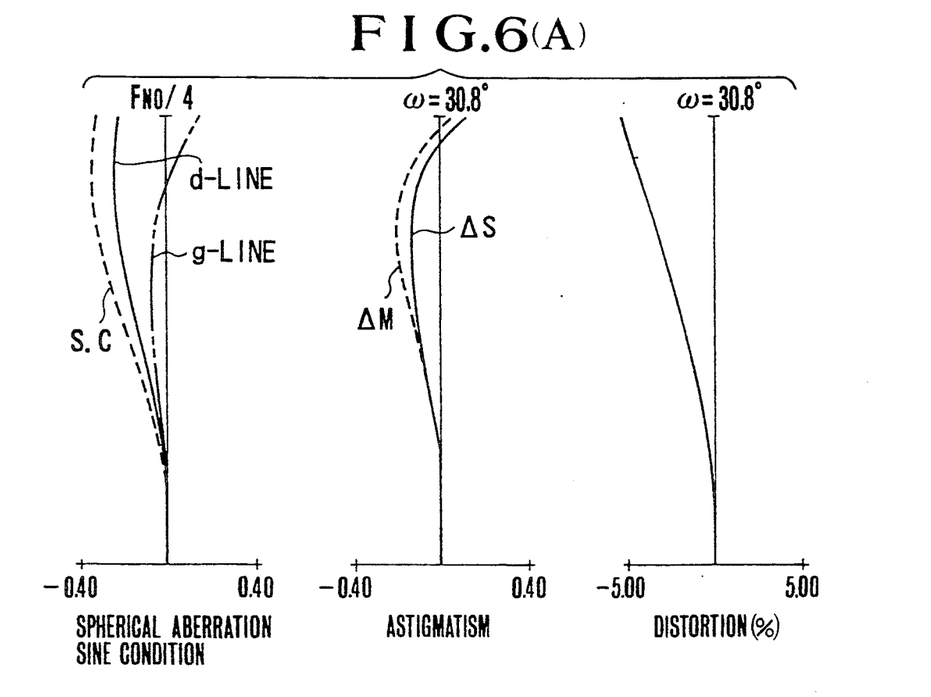
Figure 6B:
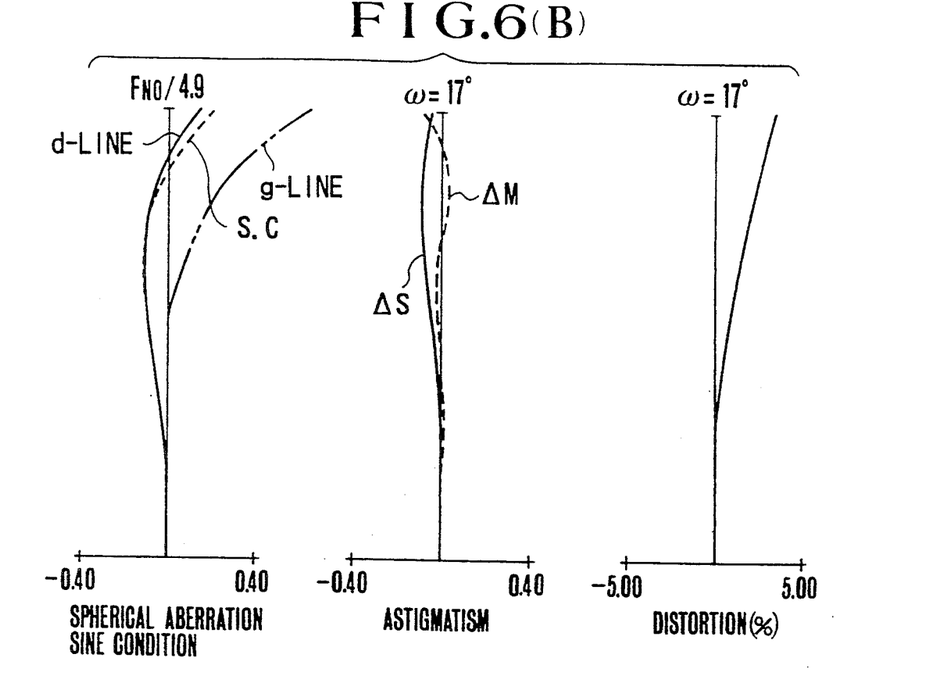
Figure 6C:
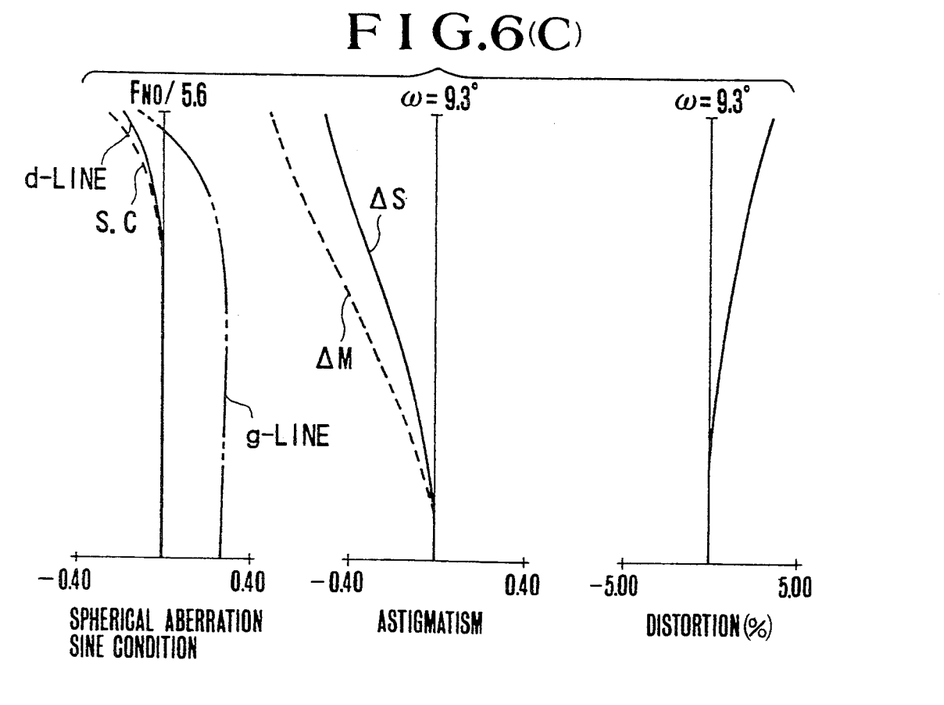
Figure 7A:
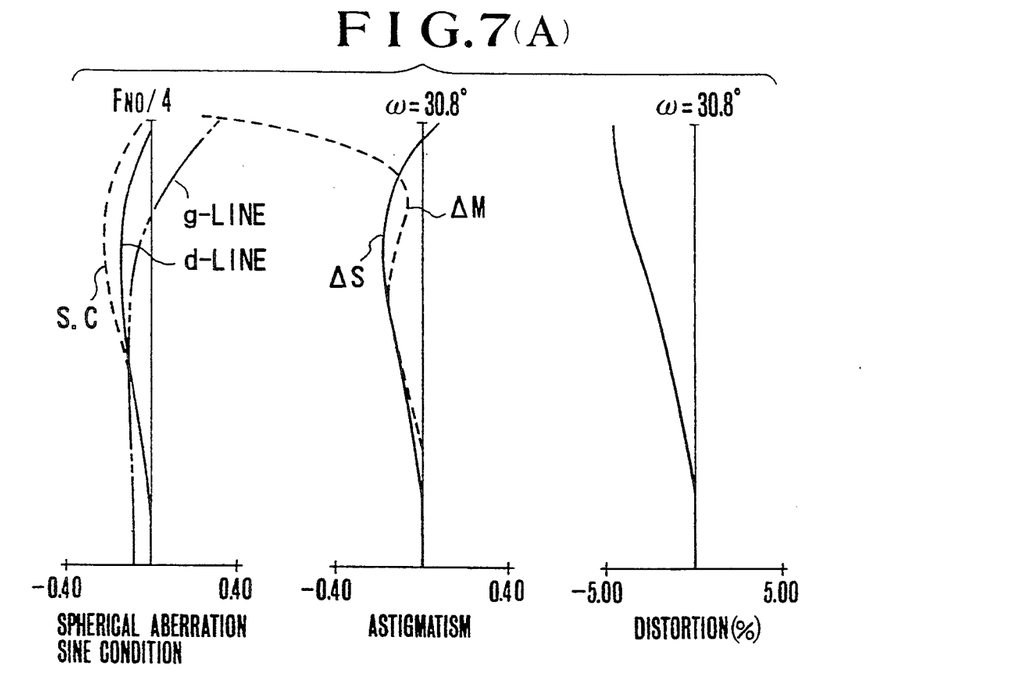
Figure 7B:
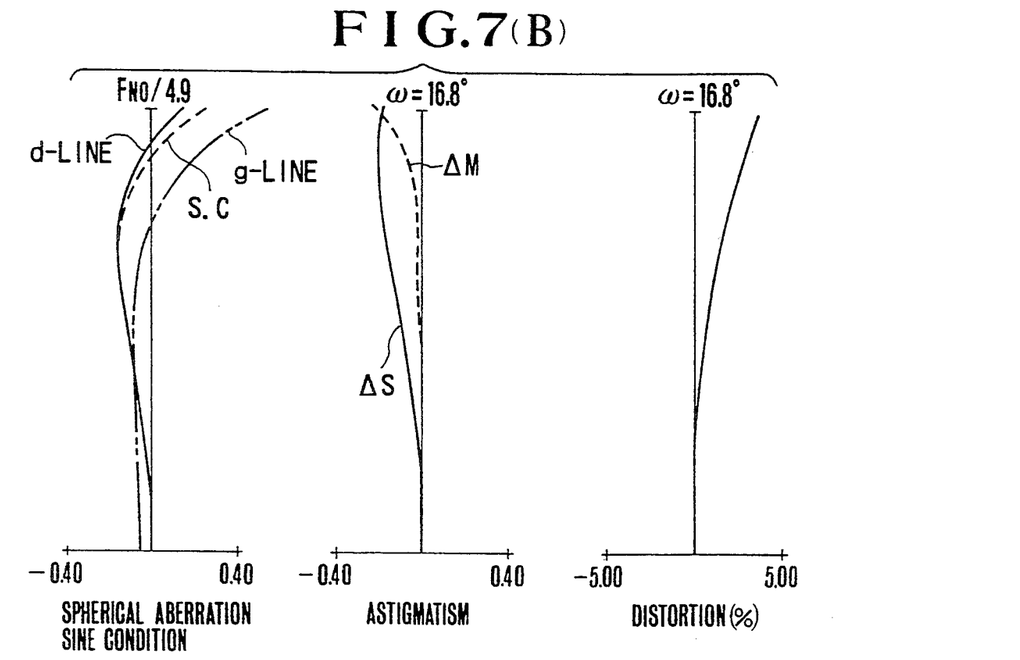
Figure 7C:
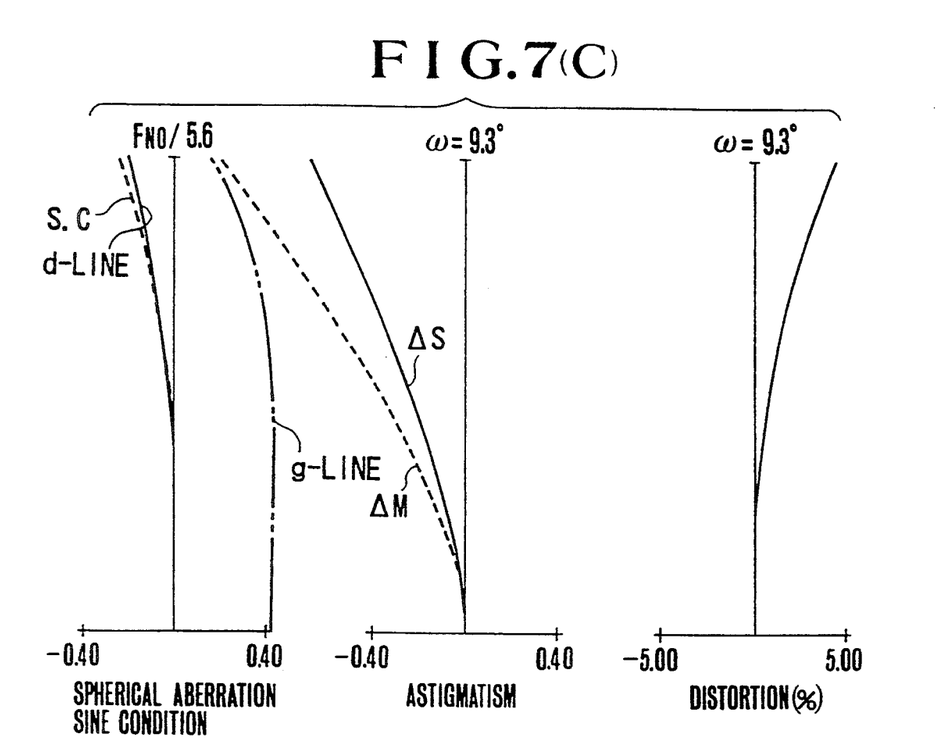

FIG. 1 schematically shows the paraxial refractive power arrangement of a general embodiment of a zoom lens according to the invention. FIG. 2 to FIG. 4 in block diagram show specific zoom lenses of the invention, of which the numerical data will be shown later.

The zoom lens comprises, from front to rear, a first lens group I of positive refractive power, a second lens group II of negative refractive power, a third lens group III of positive refractive power, and a fourth lens group of positive or negative refractive power. When zooming from the wide-angle end to the telephoto end, the first three lens groups moves axially along respective loci shown by straight or curved lines with arrows.

In more detail, zooming from the wide-angle end to the telephoto end is performed by moving forward the first and third lens groups in such ways that the air separation between the first and second lens groups increases, the air separation between the second and third lens groups decreases and the air separation between the third and fourth lens groups increases. In addition, for focusing purposes, on the other hand, as the object distance decreases from infinity to a minimum, the second lens group is made to move axially forward, wherein letting the focal length of the first lens group be denoted by $f_1$, the shortest and longest focal lengths of the entire lens system by fW and fT respectively, the image magnifications of the second lens group in the wide-angle end and the telephoto end with an infinitely distant object by $\beta 2W$ and $\beta 2T$ respectively, and the image magnification of the second lens group in the wide-angle end with a closest object at the minimum distance by $\beta 2WS$, the invention sets forth the following conditions:

$$-0.85 < \beta 2T < -0.65 \qquad (1)$$

$$0.45 < f1/fT < 0.65 \qquad (2)$$

$$1.5 < (\beta 2W/\beta 2T) \times (fT/fW) < 2 \qquad (3)$$

$$0.6 < \beta 2WS/\beta 2W < 0.9 \qquad (4)$$

Further, during the zooming, the second lens group is made to move non-linearly as necessity arises. In the present embodiment, the first to third lens groups move at different speeds to effect zooming. Focusing from an infinitely distant object to a closest object is performed by moving the second lens group forward as indicated by an arrow.

In the present embodiment, when zooming from the wide-angle end to the telephoto end, the first lens group is moved forward to increase the air separation between the first and second lens groups. This not only allows the first lens group to contribute to a variation of the image magnification but also assists in promoting the image magnification varying effect of the second lens group, so that it is made easy to increase the range of variation of the image magnification, while still permitting the total length of the lens to be shortened in the wide-angle end. Further, the third lens group, too, is made to move likewise forward. Thus, not only the second lens group but also third lens group takes its share in the function of varying the image magnification.

In such a way, in the present embodiment, by employing the lens arrangement that the first, second and third lens groups bear their own shares in the image varying function, the increase of the range of variation of the image magnification is achieved with ease while still minimizing the bulk and size of the entire lens system.

In general, the use of the frontmost or first lens group in focusing, or the so-called front focusing method, because, at any focal length, the amount of movement of the first lens group comes to be constant for the same object distance, has an advantage that the structure of the lens barrel is simple.

However, in application of this method to the wide-angle zoom lens whose first lens group has a positive refractive power, when focusing on a closest object in the wide-angle end, the first lens group moves forward. To admit of the off-axial light beam, therefore, the effective diameter of the first lens group must be increased. Also, its weight gets relatively heavy. When used in, for example, the camera having the automatic focusing device, a drawback arises that the focusing speed is slow.

So, in the invention, for a zoom lens of the configuration described above, the inner focusing method in which the second lens group moves forward as focusing from an infinitely distant object to a closest object, is employed to thereby prevent the effective diameter of the first lens group from increasing, thus affording to make a minimization of the bulk and size of the entire lens system.

Another advantage arising from the use of the second lens group of relatively light weight in focusing is that when in application to the camera having the automatic focusing device, the torque of the drive means is reduced to facilitate increase of the focusing speed.

And, the frontmost lens surface of the second lens group is formed to convex curvature toward the front. Thereby the range of variation of the angle of incidence of the light beam on the second lens group with axial focusing movement of the second lens group is reduced for good stability of aberration correction against focusing.

Next, the technical significance of each of the above-described conditions is explained.

The inequalities of condition (1) are to set a proper range for the image magnification of the second lens group in the telephoto end and have an aim to make it possible to fulfill the requirements of minimizing the size of the entire lens system and of using the second lens group in focusing.

When the upper limit of the condition (1) is exceeded, the image magnification in the wide-angle end must be decreased in order to obtain the predetermined zoom ratio. Along this comes the necessity of strengthening the refractive power. Therefore, large various aberrations are produced. When the lower limit of the condition (1) is exceeded, the gradient of the cam for lens drive becomes steep. Also, when the unity magnification ($-1x$) is exceeded, the second lens group is no longer able to effect focusing. So, that should be avoided.

The inequalities of condition (2) are concerned with the refractive power of the first lens group and have aims chiefly to lessen the variation of aberrations with zooming and to give the second lens group a predetermined magnification varying function efficiently.

When the upper limit of the condition (2) is exceeded, the total zooming movement of the first lens group must be increased with the result of an increase of the diameter of the first lens group. Also, the spacing between the second and third lens groups must be taken previously wide in the wide-angle end, which causes the total length of the lens to increase. When the lower limit of the condition (2) is exceeded, the variation of aberrations with zooming increases and the sensitivity or the ratio of the image plane shift to the axial deviation of the first lens group increases so largely that the manufacturing tolerance becomes objectionably severe.

The inequalities of condition (3) have aims that within the framework of the conditions (1) and (2), the image magnifications of the second lens group in the wide-angle and telephoto ends are made proper to facilitate the increase of the zoom ratio, and use is made of the second lens group in focusing in such conditions that the sensitivity of the second lens group is maintained at a proper value and at the same time the air separation between the first and second lens groups is shortened.

When the upper limit of the condition (3) is exceeded, the image varying effect of the second lens group becomes small so that the zoom ratio becomes difficult to increase. Also the sensitivity of the second lens group in the wide-angle end becomes small so that the total focusing movement of the second lens group increases largely. Therefore, the diameter of the first lens group and the total length of the lens are caused to increase objectionably.

When the lower limit of the condition (3) is exceeded, the amount of movement of the air separation between the first and second lens groups with zooming increases. Therefore, a space for the movement must previously be kept in the lens system. Hence, the total length of the lens increases and the gradient of the cam for lens drive gets stronger. So, that is no good.

The inequalities of condition (4) are concerned with the ratio of the image magnifications for an infinitely distant object and an object at the minimum distance of the second lens group in the wide-angle end.

When the image magnification for the closest object is small beyond the upper limit of the condition (4), the minimum object distance becomes too much far. When the image magnification for the closest object is large beyond the lower limit of the condition (4), the total focusing movement of the second lens group under the conditions (1), (2) and (3) increases. For this reason, the air separation between the first and second lens group must be taken previously wide in the wide-angle end. Therefore, the diameter of the first lens group increases objectionably.

To further improve the optical performance while still maintaining the minimization of the entire lens system to be achieved, the invention sets forth the following conditions:

$$0.1 < |f2/fT| < 0.15 \quad (5)$$

$$0.12 < f3/fT < 0.3 \quad (6)$$

where f2 and f3 are the focal lengths of the second and third lens groups respectively.

The inequalities of condition (5) are concerned with the refractive power of the second lens group and have an aim chiefly to maintain the excellent optical performance while still affording to minimize the size of the entire lens system.

When the upper limit of the condition (5) is exceeded, the magnification varying effect of the second lens group decreases. To keep the predetermined zoom ratio, therefore, the movements of the first and third lens groups must be increased. At this time, predetermined surplus spaces for assuring these movements must be created in the interior of the lens system. Therefore, the total length of the lens comes to increase. When the lower limit of the condition (5) is exceeded, over-correction of spherical aberration for the telephoto end results. Coma and astigmatism, too, vary with zooming to a great extent. So, all these aberrations become difficult to correct in good balance.

The inequalities of condition (6) are concerned with the refractive power of the third lens group and have an aim chiefly to well correct various aberrations while still permitting the predetermined zoom ratio to be secured.

When the upper limit of the condition (6) is exceeded, the back focal distance becomes longer than necessary so that the total length of the lens comes to increase. When the lower limit of the condition (6) is exceeded, the variation of aberrations with zooming increases. Particularly on the telephoto side, spherical aberration becomes difficult to correct well.

It should be noted that since, in the present embodiment, the fourth lens group has its refractive power become weak due to the lens configuration, because even if it is made to move when zooming, the magnification varying effect is little, it is better to leave it stationary during zooming, so that the lens barrel is simplified.

Also, it is recommended that the fourth lens group is formed to a negative refractive power so that the whole lens system gets a stronger tendency to the telephoto type, giving an advantage that the total length of the lens is easily shortened.

A zoom lens which accomplishes the objects of the invention is achieved by satisfying the above-described various conditions. To further improve the correction of the variation of aberrations with zooming for a higher grade optical performance over the entire range of variation of the focal length, while still maintaining the minimization of the bulk and size of the entire lens system to be achieved, all the lens groups may be constructed individually as follows:

In the order from the front, the aforesaid first lens group includes a negative first lens of meniscus shape, a second lens of biconvex shape, these lenses being cemented together to form a cemented lens, and a positive third lens of meniscus shape. The aforesaid second lens group includes a negative first lens of meniscus shape convex toward the object side, a bi-concave second lens having the front refracting surface of strong curvature, a bi-convex third lens and a negative fourth lens of meniscus shape convex toward the image side. The aforesaid third lens group includes two positive lenses, or first and second lenses, having the front refracting surfaces of strong curvature, a positive third lens having the front refracting surface of strong curvature, a negative fourth lens having the rear refracting surface of strong curvature, and a positive fifth lens of bi-convex shape. The fourth lens group includes a negative first lens having the front refracting surface of strong curvature, and a positive second lens having the rear refracting surface of strong curvature.

Incidentally, the term "front refracting surface of strong curvature" means that it is compared with the opposite, in this instance, rear, one. The same applies to the rear refracting surface of strong curvature.

In the type of zoom lens according to the present embodiment, from the first lens group, increasing spherical aberration and longitudinal chromatic aberration are produced. For this reason, the first lens group is made constructed in the fashion described above, so that it gets as thin a thickness as possible, when correcting all these aberrations. Particularly, the first lens and the second lens are brought into cemented contact, thereby lessening the longitudinal chromatic aberration to be produced. Also, by the spherical aberration produced from the cemented lens surface, the spherical aberration which is produced from the otherwise constructed first lens group is corrected. And the positive third lens is made to take a share of the refractive power for the first lens group. This allows the curvature of each lens surface to be weakened. Thus, the various aberrations are corrected in good balance.

Of the constituent lenses of the second lens group, the first lens is used to correct chiefly distortion. The positive spherical aberration produced from each of the diverging lens surfaces of the second lens is corrected by strengthening the refractive power of the front or converging surface of the third lens. This increase of the positive power of the front surface of the third lens results in production of higher order aberrations, which are then corrected by the front surface of the bi-concave second lens, as the refractive power of this front surface is made strong, since the second lens, even if strengthened in negative refractive power, hardly produces spherical aberration.

Furthermore, the air lens formed by the third and fourth lenses is used to correct the various aberrations to be produced with zooming in good balance. It is to be noted in this connection that it is preferable on aberration correction to form the air lens to a convex shape toward the image side.

In the present embodiment, the radii of curvature R8 and R9 of the front and rear surfaces of the second lens of the second lens group respectively, and the radius of curvature R10 of the front surface of the third lens group of the second lens group are, preferably on aberration correction, let to fall in the following relationships:

$$|R10| < |R8| < |R9|$$

Also, letting the refractive indices of the materials of the first and second lenses of the second lens group be denoted by N4 and N5 respectively, $$1.7 < N4$$

$$1.7 < N5$$

are set forth. The employment of such high refractive index materials allows the radius of curvature of the lens surface to increase, which makes it possible to reduce the higher order aberrations produced and to lessen distortion.

Incidentally, if the chromatic aberrations produced by the second lens group can be corrected, it is better to modify them to:

$$1.8 < N4$$

$$1.8 < N5$$

While a relatively strong positive refractive power is assigned to the third lens group, the light beam arriving at the third lens group is, in this embodiment, of strong divergence.

For this reason, the first three lenses of the third lens group are made positive and formed to predetermined shapes so that the diverging beam gets progressively stronger tendencies to convergence in passing through these three positive lenses. This enables the diameter of the outer lens barrel to be minimized in such a way as to lessen the amount of higher order aberrations produced. Further, the fourth lens is made negative to thereby shift the front principal point of the third lens group forward. This enables the total length of the lens to be shortened.

In particular, the rear surface of the fourth lens is made concave to so strong a refractive power as to cancel the various aberrations produced from the other surfaces in the third lens group. Thus, the various aberrations produced by the third lens group are corrected in good balance. Also, in the present embodiment, the fifth lens is formed to a bi-convex shape, that is, the rearmost surface of the third lens group becomes a converging surface, thereby well correcting the various aberrations.

The fourth lens group is constructed from two lenses as has been described above chiefly to correct chromatic aberrations and off-axial aberrations in good balance. Particularly the variation of astigmatism with zooming is well corrected.

In more detail, in the present embodiment, the aperture stop is unified with the third lens group, or arranged adjacent to the third lens group to axially move when zooming. By this, the position of incidence of the off-axial light beam which passes through the fourth lens group is caused to change as the image magnification changes. In such a way, the astigmatism is corrected well.

It is to be noted that in the present embodiment, at least one of the lens surfaces of the rearmost or fifth lens of the third lens group is preferably made aspheric, so that the absolute amount of spherical aberration and its zoom-dependent component are removed, and the zoom-dependent component of coma and the absolute value of astigmatism are minimized.

It is also to be noted that in the present embodiment, a so-called flare stop is preferably provided as arranged in the space between the third and fourth lens groups to axially move with zooming, so that the flare produced when the image angle lies in an intermediate region of the range can be removed well.

Next, numerical examples 1 to 3 of zoom lenses of the invention are shown. In the numerical examples 1 to 3, Ri is the radius of curvature of the i-th lens surface, when counted from the front, Di is the i-th lens thickness or air separation, when counted from the front, and Ni and vi are respectively the refractive index and Abbe number of the glass of the i-th lens element, when counted from the front.

The shape of an aspheric surface is expressed in coordinates with its X axis in the axial direction and its H axis in the perpendicular direction to the optical axis, the direction in which light advances being taken as positive, by the following equation:

$$X = \frac{(1/R)H^2}{1 + \sqrt{1 - (H/R)^2}} + AH^2 + BH^4 + CH^6 + DH^8$$

where R is the radius of the osculating sphere, and A, B, C and D are the aspheric coefficients.

The values of the factors of the above-described conditions (1) to (6) for the numerical examples 1 to 3 are listed in Table-1.

| Numerical Example 1 (FIGS. 2, 5(A), 5(B) & 5(C)) | | | |
|---|---|---|---|
| F = 36.3 − 131.7 | Fno = 1:4 − 5.6 | 2ω = 61.6° − 18.7° | |
| R1 = 191.67 | D1 = 2.40 | N1 = 1.80518 | v1 = 25.4 |
| R2 = 58.88 | D2 = 7.00 | N2 = 1.60311 | v2 = 60.7 |
| R3 = −177.75 | D3 = 0.12 | | |
| R4 = 37.51 | D4 = 4.40 | N3 = 1.60311 | v3 = 60.7 |
| R5 = 101.06 | D5 = Variable | | |
| R6 = 77.15 | D6 = 1.25 | N4 = 1.77250 | v4 = 49.6 |
| R7 = 14.70 | D7 = 5.15 | | |
| R8 = −41.39 | D8 = 1.00 | N5 = 1.80400 | v5 = 46.6 |
| R9 = 54.44 | D9 = 0.50 | | |
| R10 = 28.05 | D10 = 4.00 | N6 = 1.80518 | v6 = 25.4 |
| R11 = −46.42 | D11 = 1.10 | | |
| R12 = −22.56 | D12 = 1.00 | N7 = 1.77250 | v7 = 49.6 |
| R13 = −103.61 | D13 = Variable | | |
| R14 = (Stop) | D14 = 1.00 | | |

-continued

| | | | |
|---|---|---|---|
| R15 = 28.24 | D15 = 3.60 | N8 = 1.55962 | ν8 = 61.2 |
| R16 = −325.60 | D16 = 0.15 | | |
| R17 = 21.64 | D17 = 3.30 | N9 = 1.51633 | ν9 = 64.1 |
| R18 = 102.66 | D18 = 0.40 | | |
| R19 = 31.71 | D19 = 5.31 | N10 = 1.51633 | ν10 = 64.1 |
| R20 = 56.70 | D20 = 0.80 | | |
| R21 = −2154.79 | D21 = 2.00 | N11 = 1.84666 | ν11 = 23.9 |
| R22 = 14.72 | D22 = 1.25 | | |
| R23 = 19.40 | D23 = 4.00 | N12 = 1.64769 | ν12 = 33.8 |
| R24 = −62.00 (Aspheric) | D24 = Variable | | |
| R25 = Flare Stop | D25 = Variable | | |
| R26 = −23.73 | D26 = 1.10 | N13 = 1.78590 | ν13 = 44.2 |
| R27 = 624.35 | D27 = 4.60 | N14 = 1.53256 | ν14 = 45.9 |
| R28 = −20.14 | | | |

Lens Separations during Zooming

| Focal Length | 36.30 | 70.58 | 131.70 |
|---|---|---|---|
| D5 | 2.49 | 14.47 | 24.51 |
| D13 | 19.40 | 9.77 | 1.86 |
| D24 | 0.66 | 5.80 | 10.47 |
| D25 | 3.80 | 9.82 | 15.30 |

Aspheric Coefficients:
A = 0
B = 2.29113 × 10$^{-5}$
C = 1.08793 × 10$^{-8}$

Numerical Example 2 (FIGS. 3, 6(A), 6(B) & 6(C))
F = 36.3 − 131.7    FNo = 1:4 − 5.6    2ω = 61.6° − 18.7°

| | | | |
|---|---|---|---|
| R1 = 193.70 | D1 = 2.40 | N1 = 1.80518 | ν1 = 25.4 |
| R2 = 58.99 | D2 = 7.00 | N2 = 1.60311 | ν2 = 60.7 |
| R3 = −171.07 | D3 = 0.12 | | |
| R4 = 37.28 | D4 = 4.40 | N3 = 1.60311 | ν3 = 60.7 |
| R5 = 97.60 | D5 = Variable | | |
| R6 = 79.10 | D6 = 1.25 | N4 = 1.77250 | ν4 = 49.6 |
| R7 = 14.76 | D7 = 5.15 | | |
| R8 = −41.70 | D8 = 1.00 | N5 = 1.80400 | ν5 = 46.6 |
| R9 = 54.82 | D9 = 0.50 | | |
| R10 = 28.08 | D10 = 4.00 | N6 = 1.80518 | ν6 = 25.4 |
| R11 = −46.74 | D11 = 1.10 | | |
| R12 = −22.61 | D12 = 1.00 | N7 = 1.77250 | ν7 = 49.6 |
| R13 = −105.30 | D13 = Variable | | |
| R14 = (Stop) | D14 = 1.00 | | |
| R15 = 28.33 | D15 = 3.60 | N8 = 1.55962 | ν8 = 61.2 |
| R16 = −303.83 | D16 = 0.15 | | |
| R17 = 22.38 | D17 = 3.30 | N9 = 1.51633 | ν9 = 64.1 |
| R18 = 96.75 | D18 = 0.40 | | |
| R19 = 30.66 | D19 = 5.60 | N10 = 1.51633 | ν10 = 64.1 |
| R20 = 60.62 | D20 = 0.80 | | |
| R21 = −1239.38 | D21 = 2.00 | N11 = 1.84666 | ν11 = 23.9 |
| R22 = 14.81 | D22 = 1.25 | | |
| R23 = 19.48 | D23 = 4.00 | N12 = 1.64769 | ν12 = 33.8 |
| R24 = −62.00 (Aspheric) | D24 = Variable | | |
| R25 = (Flare Stop) | D25 = Variable | | |
| R26 = −23.42 | D26 = 1.10 | N13 = 1.78590 | ν13 = 44.2 |
| R27 = 584.18 | D27 = 4.60 | N14 = 1.53256 | ν14 = 45.9 |
| R28 = −19.84 | | | |

Lens Separations during Zooming

| Focal Length | 36.30 | 70.58 | 131.70 |
|---|---|---|---|
| D5 | 2.46 | 14.44 | 24.49 |
| D13 | 19.40 | 9.77 | 1.86 |
| D24 | 0.48 | 5.62 | 10.30 |
| D25 | 4.00 | 10.02 | 15.50 |

Aspheric Coefficients:
A = 0
B = 2.2554 × 10$^{-5}$
C = 1.04924 × 10$^{-8}$

Numerical Example 3 (FIGS. 4, 7(A), 7(B) & 7(C))
F = 36.3 − 131.7    FNo = 1:4 − 5.6    2ω = 61.6° − 18.7°

| | | | |
|---|---|---|---|
| R1 = 181.13 | D1 = 2.30 | N1 = 1.80518 | ν1 = 25.4 |
| R2 = 55.94 | D2 = 7.50 | N2 = 1.55962 | ν2 = 61.2 |
| R3 = −123.08 | D3 = 0.12 | | |
| R4 = 35.44 | D4 = 4.50 | N3 = 1.55962 | ν3 = 61.2 |
| R5 = 90.34 | D5 = Variable | | |
| R6 = 93.40 | D6 = 1.25 | N4 = 1.77250 | ν4 = 49.6 |
| R7 = 15.47 | D7 = 4.90 | | |
| R8 = −45.15 | D8 = 1.00 | N5 = 1.80400 | ν5 = 46.6 |
| R9 = 50.14 | D9 = 0.50 | | |

-continued

| | | | |
|---|---|---|---|
| R10 = 28.10 | D10 = 3.90 | N6 = 1.80518 | ν6 = 25.4 |
| R11 = −48.93 | D11 = 1.10 | | |
| R12 = −21.73 | D12 = 1.00 | N7 = 1.77250 | ν7 = 49.6 |
| R13 = −89.13 | D13 = Variable | | |
| R14 = (Stop) | D14 = 1.50 | | |
| R15 = 43.04 | D15 = 2.85 | N8 = 1.60311 | ν8 = 60.7 |
| R16 = −513.92 | D16 = 0.15 | | |
| R17 = 27.27 | D17 = 2.80 | N9 = 1.58913 | ν9 = 61.2 |
| R18 = 56.17 | D18 = 0.25 | | |
| R19 = 23.49 | D19 = 9.00 | N10 = 1.51633 | ν10 = 64.1 |
| R20 = 316.74 | D20 = 0.00 | | |
| R21 = 316.74 | D21 = 3.60 | N11 = 1.84666 | ν11 = 23.9 |
| R22 = 14.96 | D22 = 1.25 | | |
| R23 = 19.38 | D23 = 3.50 | N12 = 1.64769 | ν12 = 33.8 |
| R24 = −72.50 (Aspheric) | D24 = Variable | | |
| R25 = (Flare Stop) | D25 = Variable | | |
| R26 = −26.15 | D26 = 1.20 | N13 = 1.80610 | ν13 = 40.9 |
| R27 = 171.30 | D27 = 5.60 | N14 = 1.53256 | ν14 = 45.9 |
| R28 = −21.53 | | | |

| Lens Separations during Zooming | | | |
|---|---|---|---|
| Focal Length | 36.30 | 70.77 | 131.70 |
| D5 | 2.43 | 13.67 | 23.93 |
| D13 | 18.66 | 8.52 | 1.08 |
| D24 | 0.29 | 6.37 | 10.10 |
| D25 | 9.00 | 15.64 | 21.70 |

Aspheric Coefficients:
A = 0
B = 1.90481 × 10$^{-5}$
C = −6.69143 × 10$^{-10}$

TABLE 1

| Factor in Condition | Numerical Example | | |
|---|---|---|---|
| | 1 | 2 | 3 |
| $\beta 2T$ | −0.79 | −0.79 | −0.79 |
| f1/fT | 0.52 | 0.52 | 0.52 |
| $\frac{\beta 2W}{\beta 2T} \times \frac{fT}{fW}$ | 1.77 | 1.77 | 1.81 |
| $\beta 2WS/\beta 2W$ | 0.80 | 0.80 | 0.80 |
| \|f2/fT\| | 0.13 | 0.13 | 0.13 |
| f3/fT | 0.2 | 0.2 | 0.2 |

According to the present invention, the conditions for the zooming movements of the four lens groups of predetermined refractive power, the form and arrangement of the members of each of the lens groups and the various optical constants of the second lens group for focusing purposes are set forth as have described before, thereby making it possible to achieve a shortening of the total length of the complete lens despite the widening of the widest angular coverage to 62° and the increase of the zoom ratio to 3.7, while still preserving a high optical performance throughout the entire range of variation of the focal length. The inner focusing type zoom lens of such minimized size is suited to be used particularly in the camera having the automatic focus detecting device.

What is claimed is:

1. A zoom lens comprising:
    in the order from the object side,
    a first lens group of positive refractive power;
    a second lens group of negative refractive power;
    a third lens group of positive refractive power; and
    a last lens group,
    wherein a zooming is performed by varying an air separation between every successive two of said lens groups, and a focusing is performed by moving only said second lens group, with respect to an image plane.

2. A zoom lens according to claim 1, wherein zooming from the wide-angle end to the telephoto end is performed by widening an air separation between said first lens group and said second lens group, narrowing an air separation between said second lens group and said third lens group, and widening an air separation between said third lens group and said last lens group.

3. A zoom lens according to claim 2, wherein said last lens group is stationary.

4. A zoom lens according to claim 1 or 3, satisfying the following condition:

$$-0.85 < \beta_{2T} < -0.65$$

where $\beta_{2T}$ is the image magnification for an infinitely distant object of said second lens group in the telephoto end.

5. A zoom lens according to claim 4, wherein a frontmost lens surface of said second lens group has a convex curvature toward the object side.

6. A zoom lens according to claim 5, satisfying the following conditions:

$$0.45 < f1/fT < 0.65$$

$$1.5 < (\beta 2W/\beta 2T) \times (fT/fW) < 2$$

$$0.6 < \beta 2WS/\beta 2W < 0.9$$

where f1 is the focal length of said first lens group, fW and fT are the shortest and longest focal lengths of the entire lens system respectively, $\beta$2W and $\beta$2T are the image magnifications of said second lens group in the wide-angle end and the telephoto end respectively with an infinitely distant object, and $\beta$2WS is the image magnification of said second lens group in the wide-angle end with a closest object.

7. A zoom lens according to claim 6, satisfying the following conditions:

$$0.1 < |f2/fT| < 0.15$$

$$0.12 < f3/fT < 0.3$$

where f2 and f3 are the focal lengths of said second and third lens groups respectively.

8. A zoom lens according to claim 1, wherein said last lens group has a negative refractive power.

9. A zoom lens according to claim 8, wherein said first lens group comprises, from front to rear, a cemented lens composed of a negative first lens of meniscus shape and a bi-convex second lens, and a positive third lens of meniscus shape, said second lens group comprises a negative first lens of meniscus shape convex toward the object side, a bi-concave second lens having a strong refracting surface facing the object side, a bi-convex third lens, and a negative fourth lens of meniscus shape convex toward the image side, said third lens group comprises two positive, first and second, lenses having strong refracting surfaces facing the object side, a positive third lens having a strong refracting surface facing the object side, a negative fourth lens having a strong refracting surface facing the image side, and a positive bi-convex fifth lens, said last lens group comprises a negative first lens having a strong refracting surface facing the object side, and a positive second lens having a strong refracting surface facing the image side.

10. A zoom lens according to claim 9, wherein at least one of lens surfaces of said fifth lens of said third lens group is formed to an aspheric surface.

11. A zoom lens according to claim 10, further comprising a stop for flare removal arranged in between said third lens group and said last lens group to move axially during zooming.

12. A zoom lens comprising, from front to rear, a first lens group of positive refractive power, a second lens group of negative refractive power, a third lens group of positive refractive power, and a fourth lens group, at least two of these four lens groups being moved to effect zooming, and said second lens group being moved to effect focusing and satisfying the following condition:

$$-0.85 < \beta 2T < -0.65$$

where $\beta 2T$ is the image magnification for an infinitely distant object of said second lens group in the telephoto end.

13. A zoom lens according to claim 12, wherein a frontmost lens surface of said second lens group is convex toward the object side.

14. A zoom lens according to claim 13, wherein zooming from the wide-angle end to the telephoto end is performed by moving said first lens group and said third lens group toward the object side in such a way that an air separation between said first lens group and said second lens group increases, an air separation between said second lens group and said third lens group decreases, and an air separation between said third lens group and said fourth lens group increases, and focusing from an infinitely distant object to a closest object is performed by moving said second lens group toward the object side, said zoom lens satisfying the following conditions:

$$0.45 < f2/fT < 0.65$$

$$1.5 < (\beta 2W/\beta 2T) \times (fT/fW) < 2$$

$$0.6 < \beta 2WS/\beta 2W < 0.9$$

where f1 is the focal length of said first lens group, fW and fT are the shortest and longest focal lengths of the entire lens system respectively, $\beta 2W$ and $\beta 2T$ are the image magnifications for an infinitely distant object of said second lens group in the wide-angle end and the telephoto end respectively, and $\beta 2WS$ is the image magnification for a closest object of said second lens group in the wide-angle end.

15. A zoom lens according to claim 14, satisfying the following conditions:

$$0.1 < |f2/fT| < 0.15$$

$$0.12 < f3/fT < 0.3$$

where f2 and f3 are the focal lengths of said second lens group and said third lens group respectively.

16. A zoom lens according to claim 14, wherein said fourth lens group is stationary during zooming.

17. A zoom lens according to claim 16, wherein said fourth lens group has a negative refractive power.

18. A zoom lens according to claim 17, wherein said first lens group comprises, from front to rear, a cemented lens composed of a negative first lens of meniscus shape and a bi-convex second lens, and a positive third lens of meniscus shape, said second lens group comprises a negative first lens of meniscus shape convex toward the object side, a bi-concave second lens having a strong refracting surface facing the object side, a bi-convex third lens and a negative fourth lens of meniscus shape convex toward the image side, said third lens group comprises two positive, first and second, lenses having strong refracting surfaces facing the object side, a positive third lens having a strong refracting surface facing the object side, a negative fourth lens having a strong refracting surface facing the image side, and a positive bi-convex fifth lens, and said fourth lens group comprises a negative first lens having a strong refracting surface facing the object side, and a positive second lens having a strong refracting surface facing the image side.

19. A zoom lens according to claim 18, wherein at least one of lens surfaces of said fifth lens of said third lens group is formed to an aspheric surface.

20. A zoom lens according to claim 19, further comprising a stop for flare removal arranged in between said third lens group and said fourth lens group to move axially during zooming.

21. A zoom lens comprising, from front to rear, a first lens group of positive refractive power, a second lens group of negative refractive power, a third lens group of positive refractive power, and a fourth lens group, said first lens group and said third lens group, when zooming from the wide-angle end to the telephoto end, being moved in such a way that an air separation between said first lens group and said second lens group increases, an air separation between said second lens group and said third lens group decreases and an air separation between said third lens group and said fourth lens group increases, said zoom lens satisfying the following conditions:

$$-0.85 < \beta 2T < -0.65$$

$$0.45 < f1/fT < 0.65$$

$$0.1 < |f2/fT| < 0.15$$

$$0.12 < f3/fT < 0.3$$

where fi is the focal length of the i-th lens group, when counted from the front, fT is the longest focal length of the entire lens system, and $\beta 2T$ is the image magnification for an infinitely distant object of said second lens group.

22. A zoom lens according to claim 21, wherein said fourth lens group is stationary during zooming.

23. A zoom lens according to claim 21, wherein said fourth lens group has a negative refractive power.

24. A zoom lens according to claim 21, wherein said first lens group comprises, from front to rear, a cemented lens composed of a negative first lens of meniscus shape and a bi-convex second lens, and a positive third lens of meniscus shape, said second lens group comprises a negative first lens of meniscus shape convex toward the object side, a bi-concave second lens having a strong refracting surface facing the object side, a bi-convex third lens, and a negative fourth lens of meniscus shape convex toward the image side, said third lens group comprises two positive, first and second, lenses having strong refracting surfaces facing the object side, a positive third lens having a strong refracting surface facing the object side, a negative fourth lens having a strong refracting surface facing the image side, and a positive bi-convex fifth lens, and said fourth lens group comprises a negative first lens having a strong refracting surface facing the object side, and a positive second lens having a strong refracting surface facing the image side.

25. A zoom lens according to claim 24, wherein at least one of lens surfaces of said fifth lens of said third lens group is formed to an aspheric surface.

26. A zoom lens according to claim 24, further comprising a stop for flare removal arranged in between said third lens group and said fourth lens group to move axially during zooming.

* * * * *

UNITED STATES PATENT AND TRADEMARK OFFICE
CERTIFICATE OF CORRECTION

PATENT NO. : 5,144,488

DATED : September 1, 1992

INVENTOR(S) : HIROSHI ENDO, ET AL.

It is certified that error appears in the above-identified patent and that said Letters Patent is hereby corrected as shown below:

Column 7:
  Line 11, "|R10|<|RB|<|R9|" should read --|R10|<|R8|<|R9|--.

Column 8:
  Line 36, "vi" should read --υi--.
  Line 48, "osculating" should read --oscillating--.

Column 9:
  Numerical Example 2, "R21=-1239.38" should read --R21=-1329.38--.

Column 11:
  Line 48, "have" should read --have been--.

Column 14:
  Line 1, "0.45<f2/fT<0.65" should read --0.45<f1/fT<0.65--.

Signed and Sealed this

Twelfth Day of October, 1993

*Attest:*

BRUCE LEHMAN

*Attesting Officer*    *Commissioner of Patents and Trademarks*